United States Patent [19]

Boushey

[11] 4,210,891
[45] Jul. 1, 1980

[54] ELECTROMAGNETIC POSITION INDICATOR/DIFFERENTIAL TRANSFORMER

[76] Inventor: Homer A. Boushey, 70 Stonegate Rd., Portola Valley, Calif. 94025

[21] Appl. No.: 961,983

[22] Filed: Nov. 20, 1978

[51] Int. Cl.² ............................................. H01F 21/06
[52] U.S. Cl. .................................................. 336/135
[58] Field of Search ............... 336/132, 133, 134, 135, 336/130, 120; 323/51

[56] References Cited

FOREIGN PATENT DOCUMENTS 902770  8/1962  United Kingdom ..................... 336/135

OTHER PUBLICATIONS

IBM Technical Disclosure Bulletin, "Variable Reluctance Switching," J. R. Geddes et al., vol. 1 No. 4, Dec. 1958, p. 10.

Primary Examiner—Thomas J. Kozma
Attorney, Agent, or Firm—C. Michael Zimmerman

[57] ABSTRACT

Electromagnetic structure is described useful as either a position indicator or a differential transformer. The structure includes a pair of magnetic bodies, one of which is rotatable on its axis with respect to the other. The stationary body has three magnetic flux conductive poles projecting from the same to be in alignment with corresponding lobes circumscribing the rotatable body. Aligned poles and lobes define a portion of a pair of closed-loop magnetic flux paths through the two bodies. The middle one of the lobes extends generally transverse to the rotatable axis of the rotatable body, whereas the two outer lobes are spirally related thereto. Rotation of the rotatable body with respect to the stationary body will vary the transverse area of the magnetic material of each of its lobes facing corresponding poles of the other body and, hence, vary the amount of flux which can travel along the flux paths. A primary electrical coil carrying alternating current is wrapped around the middle one of the poles to produce flux to flow along such paths, and a pair of secondary coils connected in series opposition to one another are respectively wrapped around the two outer poles to have electromotive force generated therein proportional to the amount of flux which flows through their respectively associated poles.

9 Claims, 6 Drawing Figures

ELECTROMAGNETIC POSITION INDICATOR/DIFFERENTIAL TRANSFORMER

BACKGROUND OF THE INVENTION

The present invention relates to an electromagnetic structure useful as either a position indicator or a differential transformer. More particularly, it relates to such a structure which is quite simple and yet when it is used as a position indicator provides precise measurements of position over a wide range of positions, and when it is used as a differential transformer provides an output electromotive force whose value can be closely controlled.

Electromagnetic position indicators have been designed in the past which rely on a position change causing a corresponding measurable change in the amount of magnetic flux which flows along a closed-loop magnetic flux path. That is, flow of magnetic flux along a path defined by one or more magnetic bodies is caused by a coil interactively associated with such bodies, through which an alternating current is passed. A secondary or "pick-up" coil is also interactively associated with the body to have an electromotive force (emf) generated therein proportional to the amount of flux which flows along the path.

As is known, one of the factors which determines the amount of flux flow is the transverse area of the material through which such flux can flow. Thus, certain electromagnetic position indicators are connected to the mechanism whose position is to be measured so that any position change in the latter will result in a corresponding change in the transverse area of magnetic material and, hence, a change in the generated emf.

Electromagnetic position indicators of this type generally are fairly limited with respect to the range of position change to which they can respond. In this connection, they generally are designed so that a position change will cause a corresponding change in the degree of alignment of the poles of two magnetic bodies forming the closed-loop magnetic flux path. This results in a change in the effective transverse area through which the flux can flow along the path and causes a corresponding change in the value of the emf generated in the secondary coil. It will be recognized that the range of position changes is thereby limited to the area of the opposed pole faces. Typically, a relatively small position change will result in a fairly high change in the percentage of the facing poles in alignment with one another. This is particularly true when the motion change to be sensed is rotary. As a practical matter, with conventional arrangements, the greatest rotation orientation which can be measured is limited to about 60°. While reduction gearing extending between the mechanism whose motion is to be sensed and the position indicator will allow a greater range of motion to be sensed, this greater range is only obtained at the sacrifice of precision in measurement.

A differential transformer is an electromagnetic device in which two secondary coils interactively associated with separate poles of magnetic bodies along two different closed-loop magnetic flux paths are connected in series opposition so that the electromotive force (emf) generated in one of the coils is opposed by the emf induced in the other coil. The result is that the combined emf output represents the difference between the emf's induced in the two secondary coils. It is important for many uses of a differential transformer, that the value of the combined emf output accurately reflects the changes in the magnetic flux paths responsible for the same.

SUMMARY OF THE INVENTION

The present invention relates to an electromagnetic structure useful as either a position indicator or a differential transformer. In general, it includes a pair of magnetic bodies (referred to herein as a "rotor" and a "stator" for ease of differentiation), one of which has at least two magnetic flux conductive poles and the other of which has at least two magnetic flux conductive lobes which project therefrom to be in alignment with the poles of the first and form therewith at least one closed-loop magnetic flux path through such stator and rotor. For the purposes of this specification, a "magnetic flux conductive pole" is meant to include any magnetic flux conductive body which extends therealong a materially significant distance.

Means are also included as part of the structure for generating a changing flow of magnetic flux along the magnetic flux path defined by the rotor and stator and their alignable projections, and means are interactively associated with the bodies to have an electrical current generated therein proportional to the change in the amount of magnetic flux which does flow along such path. The position alignment of the poles with the lobes circumferentially with respect to the lobes is changeable in response, for example, to a body movement to be sensed and measured.

As a particularly salient feature of the instant invention, the lobes which extend circumferentially about one of the magnetic flux conductive bodies are spaced at differing distances from one another at differing circumferential positions thereabout. The result is that when the position of radial alignment of the poles with the lobes is changed as discussed above, the transverse area of magnetic material of the poles and lobes in flux conductive relationship will be changed correspondingly. This will change proportionately the amount of electrical current which is induced by the magnetic flux flowing along the closed-loop path.

Most desirably, the lobes project from the surface of a cylinder and extend substantially the full circumferential distance thereabout, with one of the lobes in a plane generally transverse to the axis of the cylinder, and the other spiraling therearound. This construction will assure that the lobes are spaced at continuously increasing distances apart at progressively different circumferential positions about the cylinder. Thus, changes in the radial position of the poles along the lobes in one direction can be differentiated from a change in the other direction, merely by noting whether or not the generated emf increases or decreases.

The degree of change of alignment of the poles with the lobes upon a change in the radial position of the poles depends on the "pitch" of such lobes, i.e., the degree of inclination of the spiraling lobe with respect to the axis of relative rotation between the two bodies. Thus, the pitch can be selected to provide a desired relationship between the change in magnetic flux path and the degree of motion change. This design versatility enables not only precision in measurement, but enables measurement of a wide range of positions.

It is preferable that there be at least three of such poles alignable with three lobes, two of which are spiral lobes. Two separate close-loop magnetic flux paths can then be formed, enabling a differential transformer to be provided as well as even greater measurement precision when the structure is used as a position indicator. As described below in connection with a description of the preferred embodiment, the middle one of the three lobes is positioned generally transverse to the axis of rotation, whereas the other two lobes spiral therearound. The middle lobe and the pole associated therewith are common to both paths. A primary alternate current carrying coil is interactively associated with the middle pole to generate magnetic flux along both of such paths, whereas secondary electrical coils are interactively associated with the other poles to have electrical current respectively induced therein proportional to the amount of magnetic flux flowing at any particular time along the path of which the particular pole is a part. Connection of the secondary poles to have the emf induced in one opposed by the emf induced in another provides a differential transformer, as well as a more precise position indicator.

Other features of the invention and advantages thereof will become apparent from the following more detailed description of a preferred embodiment.

BRIEF DESCRIPTION OF THE DRAWINGS

With reference to the accompanying three sheets of drawing.

DETAILED DESCRIPTION OF A PREFERRED EMBODIMENT

Figure 1:
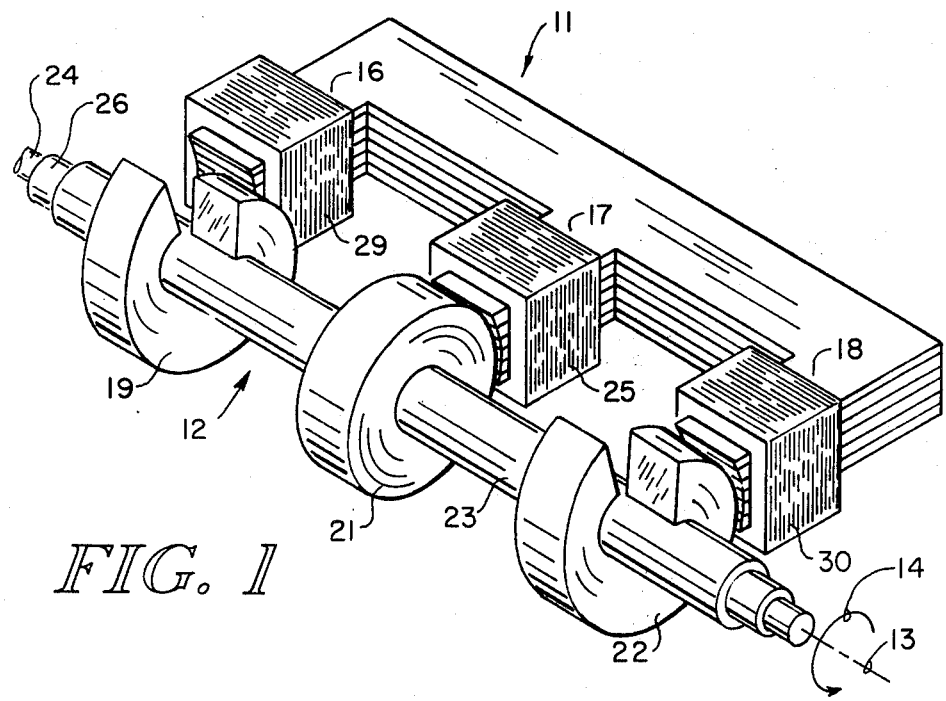
FIG. 1 is a generally schematic, isometric view of a preferred embodiment of the electromagnetic invention.

With reference first to FIG. 1, an electromagnetic structure of the invention is schematically illustrated, made up of a pair of electromagnetic bodies 11 and 12. Bodies 11 and 12 are mounted (the mounting structure being omitted for simplicity) for movement with respect to one another about axis 13. That is, the position of body 12 can be changed with respect to body 11 by rotation about axis 13 as indicated by arrow 14. Body 12 will therefore be referred to herein as a "rotor", whereas body 11 will be referred to as a "stator". It should be noted, however, that relative rotation between the two bodies is also achievable by revolving body 11 about axis 13 and maintaining body 12 either stationary with respect to a reference, or rotating such bodies at a different radial velocity with respect thereto. Thus, either or both of the bodies may act as electromagnetic "rotor" and/or "stators".

As illustrated, three poles 16, 17, and 18 of magnetic flux conductive material project from the body of the stator 11. Such poles are generally in alignment with one another and are equally spaced apart. The body of the stator 11 provides a connection of a flux conductive material between the bases of the poles.

Figure 6:
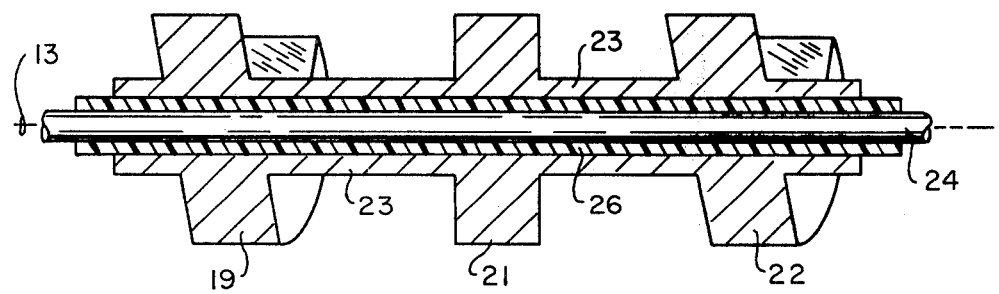
FIG. 6 is a sectional view through the rotor of the embodiment of FIG. 1.

Rotor 14 has three lobes 19, 21, and 22 projecting from base tube 23, such poles extending about tube 23 for substantially the full circumferential distance of its outer cylindrical surface. Tube 23 provides a connection between the bases of the lobes 19, 21, 22, as can be seen in FIG. 6. Such tube is mounted on an axle 24 for rotation on axis 13, which axis is also the axis of the tube. As also illustrated in FIG. 6, tube 23 is magnetically isolated from the axle 24 by a sleeve 26 of a magnetically insulating material.

The middle one of the three lobes, lobe 21, is in a plane generally transverse to the axis of the tube 23. In contrast, each of the outer or, in other words, end lobes 19 and 22 "spirals" around the tube, i.e., has a pitch relative to the axis 13. The result is that at progressively different circumferential positions about tube 23, end lobe 19 is spaced a continually increasing distance from the middle lobe 21. End lobe 22 is likewise spaced a continually increasing distance from the middle lobe 21 at progressively different circumferential positions about tube 23. However, it should be noted that whereas the distance of end lobe 22 away from middle lobe 21 increases at differing circumferential positions about the tube 23 in the direction defined by arrow 14, the distance of the other end lobe, lobe 19, from the middle lobe decreases in such direction. It is only when the distance of lobe 19 relative to middle lobe 21 is considered in the circumferential direction opposite the direction of arrow 14, that the distance between such lobes increases.

Stator 11 and rotor 12 are so mounted relative to one another that lobe 21 is always in alignment with pole 17 to complete a magnetic flux conductive path therebetween irrespective of the radial position of the rotor 12 relative to the axis 13. In this connection, means are interactively associated with pole 17 to generate the flow of magnetic flux. To this end, a primary electrical coil 25 is wrapped around such pole. The terminals of coil 25 are suitably connected electrically to the output terminals of a source of alternating current power.

Figure 2:
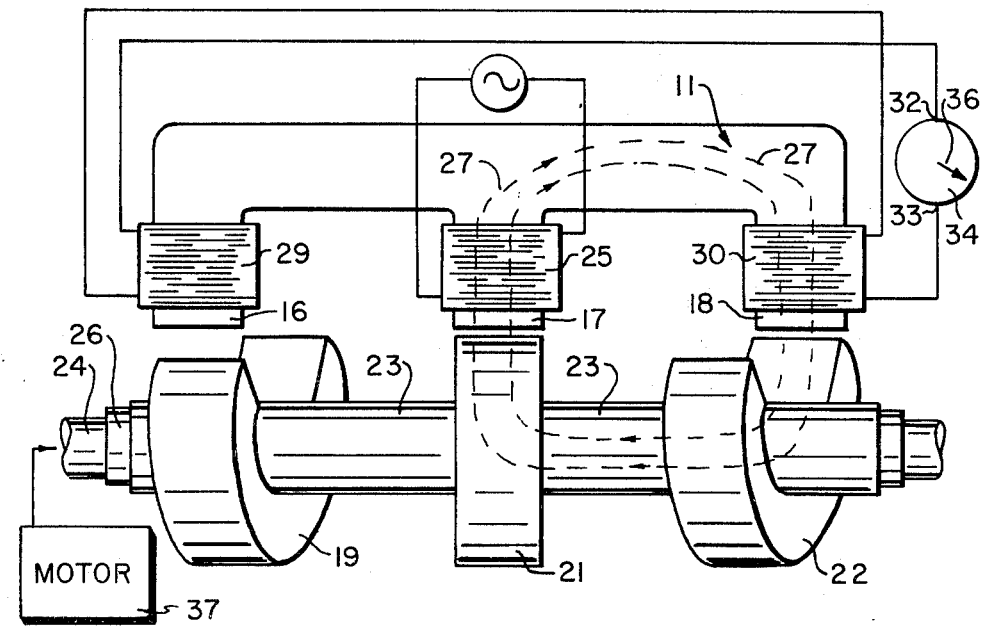
FIG. 2 is a side elevation of the embodiment of FIG. 1, showing the magnetic bodies in one state of adjustment with respect to one another and the electrical connections to the poles.
Figure 3:
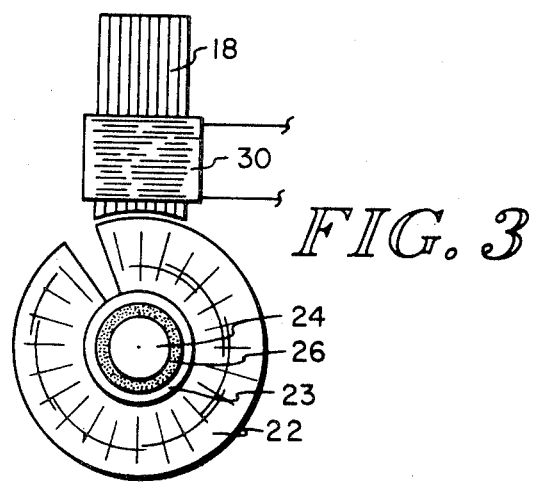
FIG. 3 is an elevation view of the right end of the embodiment of FIG. 1 as viewed in FIG. 2, showing the magnetic bodies in the same state of adjustment as shown in FIG. 2.

End lobes 19 and 22 are positioned on tube 23 to be selectively alignable with their associated poles 16 and 18 of stator 13, depending upon the radial position of the stator. That is, as illustrated in FIG. 2, at one extreme position of rotation of stator 12, the full width of lobe 22 directly opposes the face of pole 18 to complete a magnetic flux conductive path therebetween. At the same time, lobe 19 is completely misaligned with the pole 16 of stator 11 to prevent any appreciable flow of magnetic flux therebetween.

Figure 5:
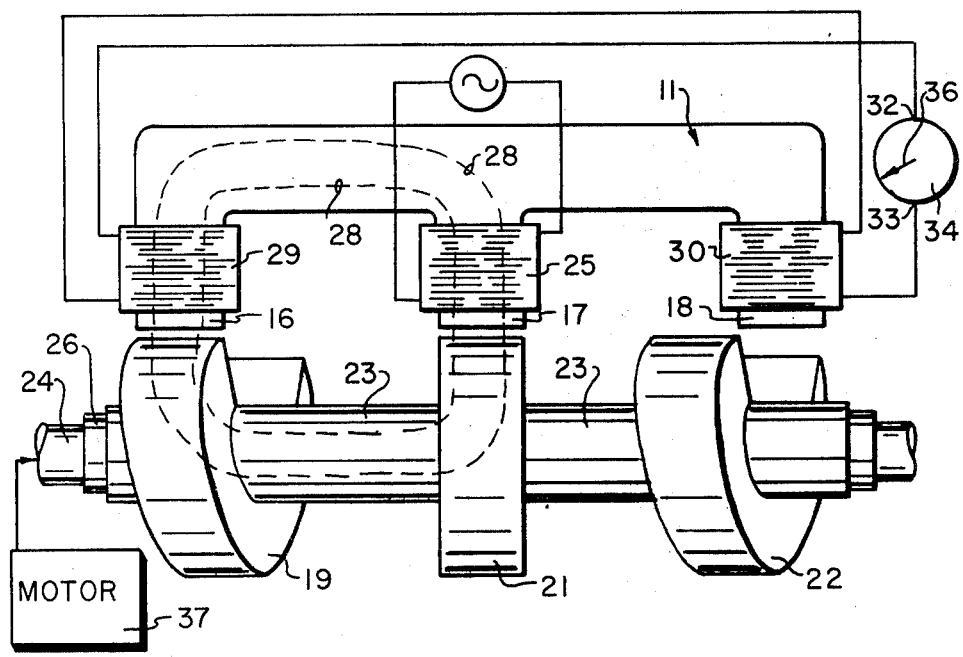
FIG. 5 is another side elevation view similar to FIG. 2 but illustrating even a third relative position of one body to another.

The pitch of the lobes 19 and 22 and their positioning on the cylinder 23 is selected so that upon rotation of shaft 24 for almost one complete revolution, e.g. 340°, the full width of lobe 19 will be in close proximity to the face of pole 16 of the stator, whereas lobe 22 will be completely misaligned with respect to the face of pole 18 (see FIG. 5).

It will be recognized from the above that the relationships of the stator and rotor represented in FIGS. 2 and 5 form two different closed-loop, magnetic flux paths. With reference to FIG. 2, the path associated with such relationship illustrated extends between the middle lobe 21 and the middle pole 17, and between end pole 18 and end lobe 22. This path is represented in FIG. 2 by the dotted line path arrows 27. On the other hand, when the stator and rotor are in the relative relationship shown in FIG. 5, the closed-loop magnetic flux path extends through end lobe 19 and end pole 16 and again through the middle pole 17 and middle lobe 21. This path is represented in FIG. 5 by the dotted line arrows 28. Such magnetic flux flow along either of such closed-loop paths will be generated, of course, by the application of alternating current to primary coil 25.

Figure 4:
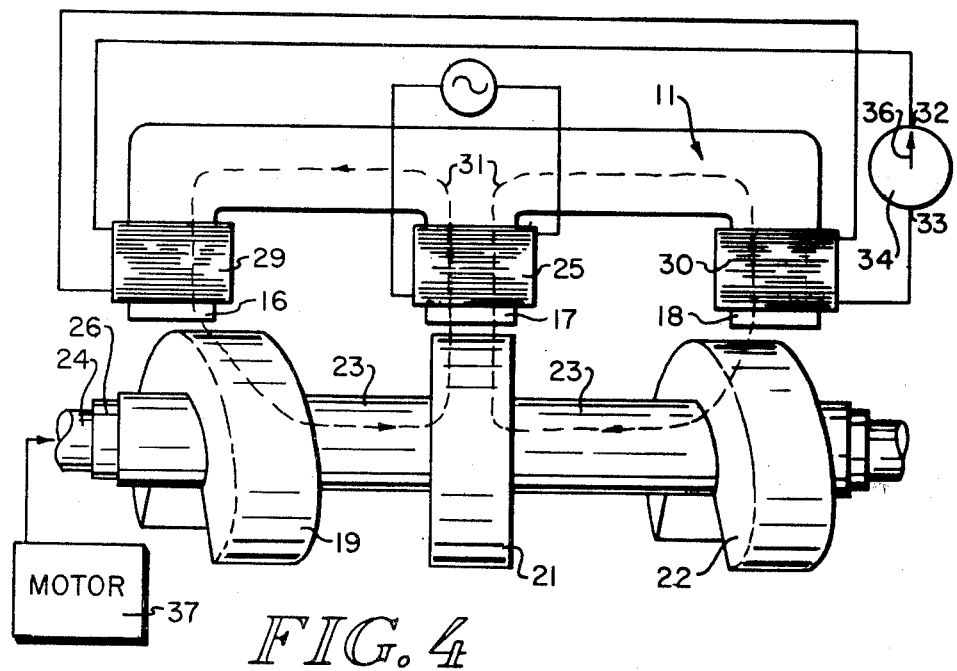
FIG. 4 is a side elevation similar to FIG. 2, but illustrating the electromagnetic bodies in a different relationship to one another.

The amount of magnetic flux which can be conducted along each of the paths represented by the arrows 27 and 28 is proportional to the minimum transverse area of magnetic flux conductive material along the path in question. Because of the particular relationship of the end spiral lobes discussed above, this transverse area can be varied merely by rotating rotor 12 about axis 13 to change the position of such rotor relative to stator 11. FIG. 4 illustrates a position of such rotor intermediate the extreme positions represented by FIG.'s 2 and 5. As illustrated, in such position each of the lobes 19 and 22 is at least partially in alignment with its respectively associated pole 16 and 18 of the stator. The result is that two closed-loop magnetic flux paths are provided, one through each of the end lobe-pole associations with both paths flowing through the middle lobe-pole association.

As noted above, the amount of flux which can flow along either of the paths is dependent upon the transverse area of the flux conductive material along such path. Since in FIG. 4 the lobes 19 and 22 are only partially in alignment widthwise with their associated poles, the amount of flux which can flow along each path is accordingly restricted. The ratio of the flux flowing along one path to that flowing along the other is directly proportional to the ratio of the transverse area of one pair of end lobes and poles to the other. It will be noted that outer lobes 19 and 22 are so related to one another that when rotation decreases the width of one in alignment with its opposed pole, the width of the other in alignment with its associated pole will correspondingly increase.

Means are provided interactively associated with the stator, to have electrical currents generated therein proportional to the changes in the amount of magnetic flux flowing at any particular time along the individual paths. That is, a pair of secondary electrical coils 29 and 30 are provided, respectively wrapped about poles 16 and 18. Each of the coils 29 and 30 will have an electromotive force induced therein upon a change in the amount of magnetic flux flowing through its associated pole. The value of this emf, however, will be dependent upon the amount of such flux which can flow through its associated pole during any given time. Thus, the emf induced in each coil will be a measure of such flux flow and, hence, a measure of the degree to which the rotor lobe associated with its pole is in alignment therewith.

Coils 29 and 30 are electrically connected together serially to cause the electromotive force induced in one to oppose the electromotive force induced in the other. Thus, upon the generation by the primary coil 24 of magnetic flux flowing in one direction at any given time, such as a direction indicated by the dotted line arrows 31 in FIG. 4, opposing emf will be generated in the coils 29 and 30. The resulting output emf appearing at, for example, the terminals 32 and 33 of voltmeter 34 will represent the difference between the emf's induced in the two secondary coils. When the flux paths passing interactively by the secondary coils 29 and 30 is equal, such as is represented by the showing in FIG. 4, the induced emf's will be equal with the result that no potential difference will appear across the output terminals 32 and 33. However, when the magnetic flux passing by one of the coils 29 and 30 is not equal to the flux passing by the other, there will be a potential difference at the terminals 32 and 33, which potential difference will be proportional to the difference in such flux flow. Moreover, the phase of any current flow due to such potential difference will depend on which of the coils has the greater electromotive force induced therein. That is, the phase of current due to a potential difference caused by the emf generated in coil 29 being less than that induced in coil 30 will be 180° out-of-phase with current produced due to the emf induced in coil 29 being greater than that induced in coil 30.

From the above, it will be appreciated that the reading on voltmeter 34 will represent the positioning of rotor 12 relative to stator 11. Moreover, such reading will vary from one extreme representing the extreme position shown in FIG. 2 in which all of the generated magnetic flux passes through the outer pole 18/lobe 22 pair to the other extreme illustrated in FIG. 5 in which all of such magnetic flux flows through the outer pole 16/lobe 19 pair. These extremes are represented by the different positions of the needle 36 of the voltmeter illustrated in FIG.'s 2 and 5. Note that in FIG. 4 needle 36 is in a position midway between the two extremes.

It should be apparent from the above how the magnetic structure of the invention can be used as a position indicator. The position of needle 36 will provide a measurement of the position at any given time of the rotor 12 with respect to the stator 11. Since the amount of transverse area providing a flux flow path at each of the outer poles is dependent upon the spiral nature of the outer lobes, various desired degrees of precision are achievable. That is, the spiral pitch of each of the lobes can be selected to provide a desired relationship between the amount of rotation of rotor 12 required to cause a selected change in the emf generated in one secondary coil relative the other and, hence, the amount of movement of needle 36.

If the electromagnetic structure of the invention is to be used as a differential transformer, the voltmeter 34 is simply replaced by whatever it is desired be fed by the output of such transformer. As discussed previously, this output will be dependent upon the relative radial position the rotor 12 to the stator 11. In this connection, block 37 is included in the drawing to represent a prime mover to selectively rotate axle 24 and, hence, change the position of alignment of the poles with respect to the lobes. Such prime mover will be replaced, of course, by mechanism imparting to the axle 24 the motion to be measured when the structure is used as a position indicator. Thus, by adjusting such position a desired output is achievable.

The specific magnetic flux material from which the stator and rotor are made, and its configuration, are immaterial to the principles of the invention. In the preferred embodiment illustrated, the stator 11 is formed from a stack of laminated iron plates. The flux conductive portion of rotor 12 is illustrated as a solid body formed, for example, from sintered, flux conductive powder. It will be recognized that the rotor also could be machined or cast from solid material or appropriately made from laminants.

While to comply with the patent statutes the invention has been described in connection with the best mode contemplated by applicant for carrying it out, it will be appreciated that various changes and modifications can be made without departing from its spirit. For example, for use of the electromagnetic structure as a position indicator, only two pole/lobe pairs are required, one (or both) of which are spirally related. Such an embodiment of the invention will provide the relatively wide range and accuracy associated with the spiral lobe concept, but will not, of course, have the additional advantages associated with the inducement of opposed emf's obtained with the preferred embodiment. It is therefore intended that the coverage afforded applicant be limited only by the claims and their equivalent language.

I claim:

1. An electromagnetic structure comprising:
   A. a pair of magnetic flux conductive bodies;
   B. a first one of said bodies having at least two magnetic flux conductive poles projecting therefrom at spaced apart locations and having a connection of a flux conductive material extending therebetween adjacent their bases;
   C. the second one of said bodies having at least two magnetic flux conductive lobes projecting therefrom, which lobes extend circumferentially about said second one and are spaced differing distances from one another at differing circumferential positions thereabout, said second one of said bodies also having a connection of a flux conductive material extending between said lobes adjacent their bases;
   D. said bodies being mounted with each pole of said first one generally alignable respectively with, and in close proximity to, an associated lobe of said second one to form a closed-loop magnetic flux path through both of said pair of bodies;
   E. means to generate a changing flow of magnetic flux along said magnetic flux path;
   F. means interactively associated with one of said bodies to have an electrical current generated therein proportional to the change in the amount of magnetic flux flowing at any particular time along said path; and
   G. the position of alignment of said poles with said lobes circumferentially with respect to said lobes being changeable to vary the transverse area of magnetic material of said poles and lobes in flux conductive relationship and thereby change proportionately the amount of electrical current generated in said last mentioned means.

2. An electromagnetic structure according to claim 1 wherein said means to generate the flow of magnetic flux along said magnetic flux includes a primary electrical coil interactively associated with a first one of said poles, and said means interactively associated with one of said bodies to have an electrical current generated therein proportional to the amount of magnetic flux flowing at any particular time along said path includes a secondary electrical coil interactively associated with a second one of said poles for the inducement in said coil of an electromotive force in response to a magnetic flux flow change in said second pole.

3. An electromagnetic structure according to claim 1 wherein said lobes are spaced a continuously increasing distance apart at progressively differing circumferential positions about said second body.

4. An electromagnetic structure according to claim 3 wherein said second body has a generally cylindrical surface configuration and each of said lobes extends substantially the full circumferential distance about said surface, one of which lobes is in a plane generally transverse to the axis of said cylindrical surface configuration and the other of which spirals therearound.

5. An electromagnetic structure according to claim 1 further including means to change the position of alignment of said poles circumferentially with respect to said lobes.

6. An electromagnetic structure according to claim 1 wherein there are three of said magnetic flux conductive poles projecting from said first one of said bodies having a connection of a flux conductive material extending therebetween adjacent their bases, and there are three of said magnetic flux conductive lobes projecting from the second one of said bodies having a connection of a flux conductive material extending therebetween adjacent their bases, the middle one of said lobes being spaced at differing distances from both of said other lobes at differing circumferential positions about said second body.

7. An electromagnetic structure according to claim 6 wherein the outer ones of said lobes are spaced continuously differing distances from said middle lobes at progressively differing circumferential positions about said second body.

8. An electromagnetic structure according to claim 6 wherein said means to generate the flow of magnetic flux along said magnetic flux path includes a primary electrical coil interactively associated with a first one of said poles, and said means interactively associated with one of said bodies to have an electrical current generated therein proportional to the amount of magnetic flux flowing at any particular time along said path includes a secondary electrical coil interactively associated with a second one of said poles for the inducement in said coil of an electromotive force in response to a magnetic flux flow change in said pole.

9. An electromagnetic structure according to claim 8 wherein said means interactively associated with said one of said bodies to have an electrical current generated therein further includes a second secondary electrical coil interactively associated with the third one of said poles for the inducement in said second secondary coil of an electromotive force in response to a magnetic flux flow change in said third pole, said first and second secondary electrical coils being electrically conncted together serially to cause the electromotive force generated in one to oppose the electromotive force generated in the other.

* * * * *